July 22, 1969  D. V. CHENOWETH  3,456,728
CONSTANT MASS FLOW APPARATUS
Filed July 14, 1967  4 Sheets-Sheet 1

INVENTOR
DAVID V. CHENOWETH
By Bernard Kriegel
ATTORNEY.

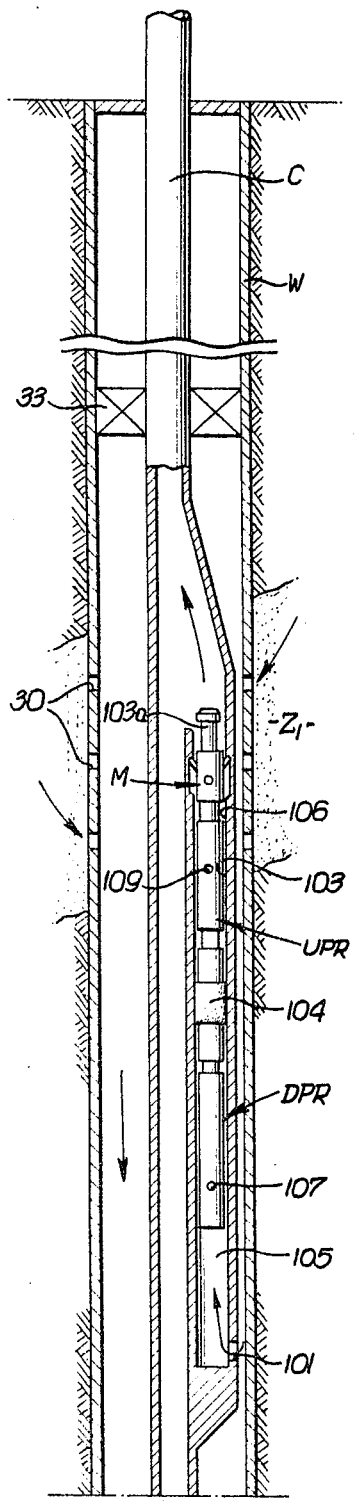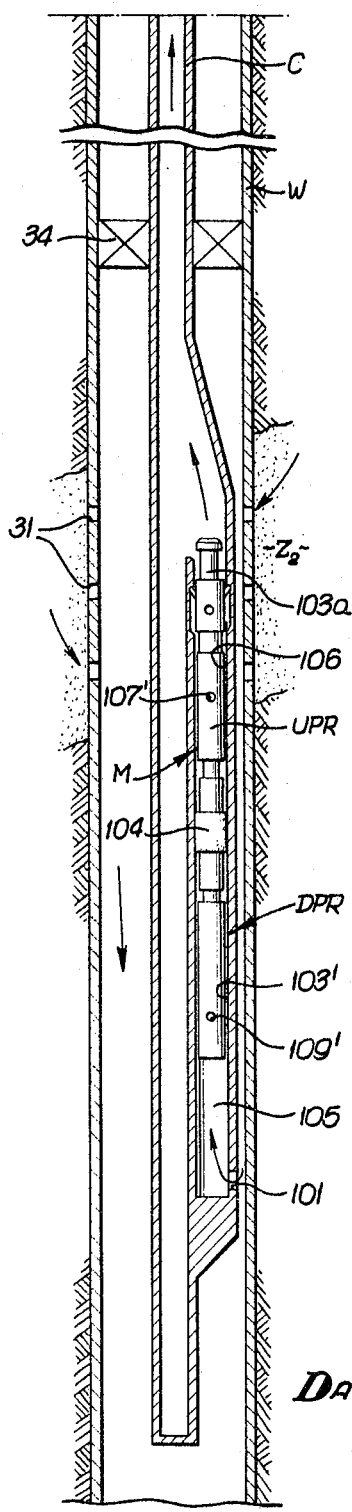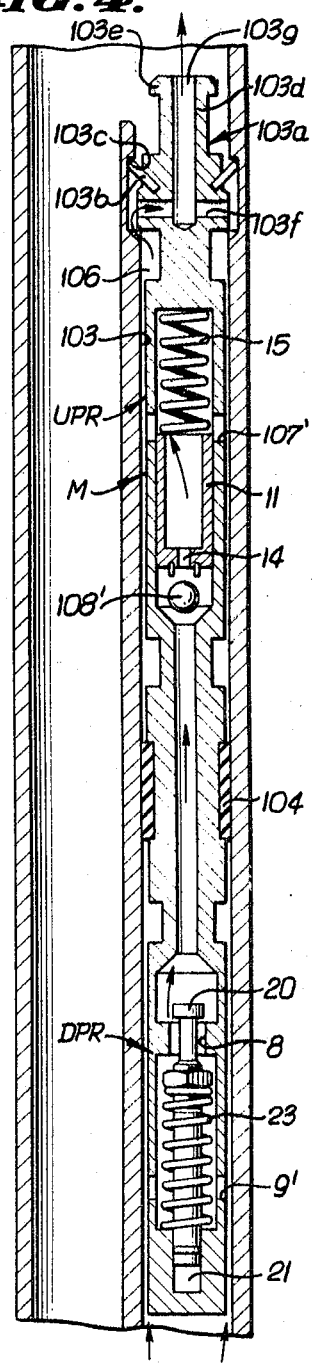

July 22, 1969  D. V. CHENOWETH  3,456,728
CONSTANT MASS FLOW APPARATUS
Filed July 14, 1967  4 Sheets-Sheet 3

INVENTOR.
DAVID V. CHENOWETH
By Bernard Kriegel
ATTORNEY.

July 22, 1969     D. V. CHENOWETH     3,456,728
CONSTANT MASS FLOW APPARATUS
Filed July 14, 1967     4 Sheets-Sheet 4

INVENTOR.
DAVID V. CHENOWETH
By Bernard Kriegel
ATTORNEY.

United States Patent Office 3,456,728
Patented July 22, 1969

3,456,728
CONSTANT MASS FLOW APPARATUS
David V. Chenoweth, Houston, Tex., assignor to Baker Oil Tools, Inc., City of Commerce, Calif., a corporation of California
Filed July 14, 1967, Ser. No. 653,554
Int. Cl. E21b *43/12;* F16k *31/12*
U.S. Cl. 166—224                                30 Claims

ABSTRACT OF THE DISCLOSURE

Apparatus for maintaining constant mass rate flow of a compressible fluid in a pipeline, or from one or more producing zones of oil and/or gas wells, by the use of combinations of upstream and downstream flow regulators and upstream and downstream pressure regulators.

---

The present invention relates to controlling the flow pressure or mass flow rate of compressible fluids such as gas or gas bearing liquid.

In the transmission of compressible fluids in pipelines, as well as in the production of compressible well fluids from one or more subsurface producing well zones, or their introduction thereinto, it is oftentimes desirable to regulate or control the flow pressure or mass rate of flow. Heretofore, such control has been accomplished by the use of relatively complex and expensive constant pressure or flow devices, generally of the differential pressure type. In the event that input or upstream pressure and output or downstream pressure are constant, then, of course, regulation of the mass flow rate, or the density of the fluid at a given location in its flow path, may be regulated by means of a simple fixed or variable orifice across which will be a constant pressure drop.

However, when the upstream and/or downstream pressure is variable, but it is nevertheless desired that the mass flow rate be maintained substantially constant, then it is necessary to employ regulating devices which are capable of eliminating the variable pressure factor at the orifice, and such prior devices as just noted above have heretofore been rather complicated in their construction, adjustment and maintenance.

Accordingly, an object of the present invention is to provide simple and effective regulating devices for use in various combinations in the control of the mass flow rate or pressure of a compressible fluid, hereinafter sometimes simply called fluid and generically including gas or gas bearing liquid.

Within the purview of the foregoing general object, the regulating devices in accordance with specific objects may be advantageously employed in a fluid transmission pipe or conduit on the earth's surface, or in the production pipes or tubings from subsurface producing oil and/or gas wells, to regulate or control the production of fluids from one or a multiplicity of producing zones, or in the injection of fluid into such one or more zones.

More specifically, an object of the invention is to provide means for controlling or regulating the passage of fluid through a conduit, in which there is a variation in the upstream and/or downstream pressures, wherein combinations of a downstream pressure regulator and an upstream flow regulator, on the one hand, or a downstream flow regulator and an upstream pressure regulator, on the other hand, may be employed to maintain a constant pressure drop across an intermediate orifice, thereby maintaining a constant fluid density at the orifice, or, in other words, a constant mass flow rate.

In accomplishing the foregoing objectives, it is a further object to provide a novel and extremely simple pressure regulator construction, wherein only a predetermined or known spring force is effective to establish the magnitude of the constant pressure to be maintained either upstream, according to one embodiment, or downstream, according to another embodiment, of the novel pressure regulator. In such a construction, it is an advantage in terms of simplicity of construction that the possibility of fluctuation in the upstream or downstream pressure need not be considered when the regulators are assembled or initially adjusted to establish a constant pressure at the regulator. Such simple pressure regulators may, therefore, be combined with various combinations of orifice devices and flow regulators to maintain a constant mass flow rate at an orifice or to perform other functions resulting from the maintenance of a constant pressure value.

This invention possesses many other advantages, and has other objects which may be made more clearly apparent from a consideration of several forms in which it may be embodied. Such forms are shown in the drawings accompanying and forming part of the present specification. These forms will now be described in detail for the purpose of illustrating the general principles of the invention; but it is to be understood that such detailed description is not to be taken in a limiting sense, since the scope of the invention is best defined by the appended claims.

Figure 7:
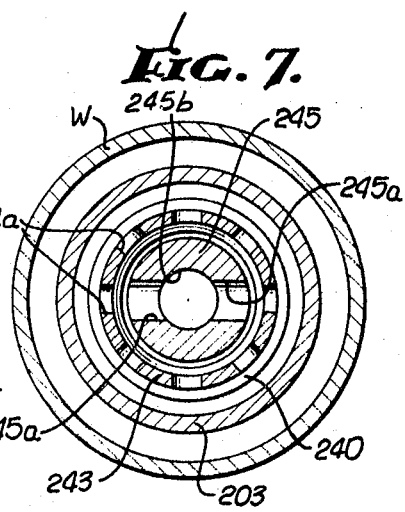
Figure 8:
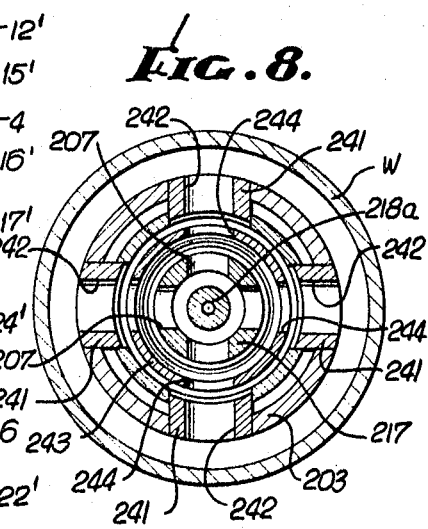
Figure 6A:
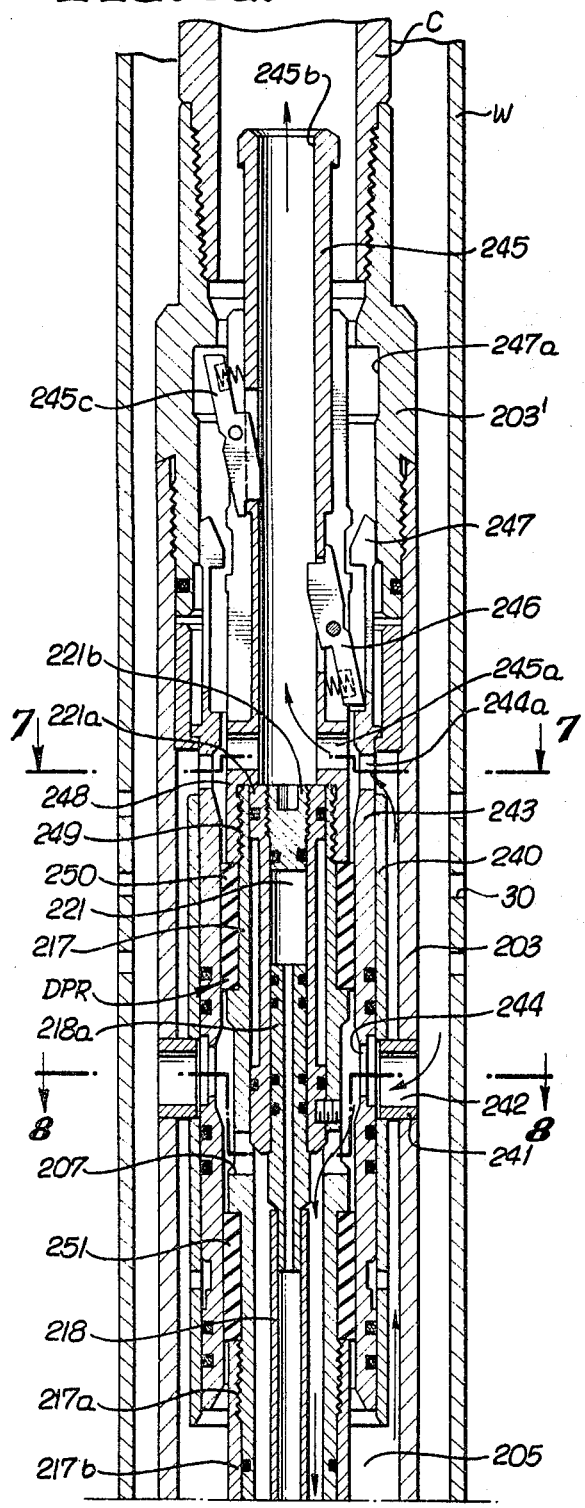
Figure 5:
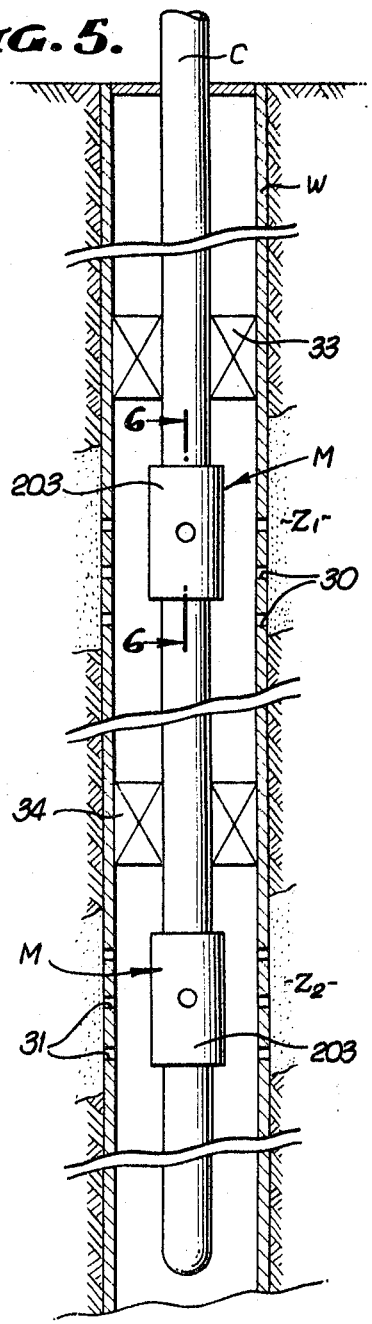
Figure 6B:
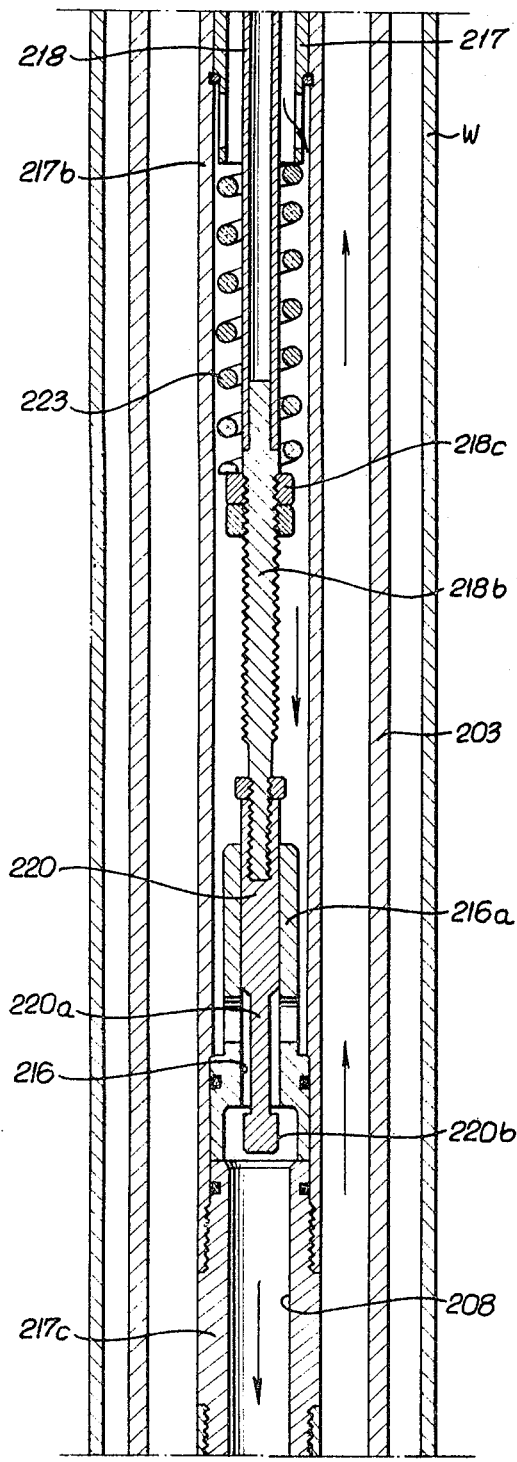
Figure 6C:
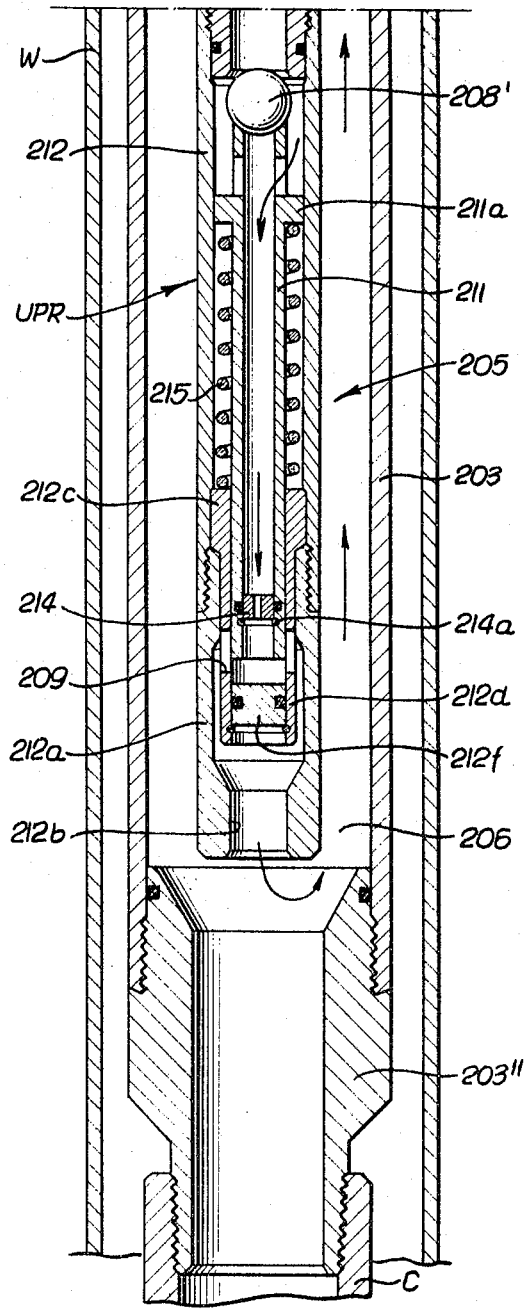

FIGS. 3*a* and 3*b* are longitudinal section views schematically showing constant mass flow apparatus at multiple zones in a well bore, FIG. 3*b* being a downward continuation of FIG. 3*a*;

FIG. 4 is a fragmentary longitudinal sectional view through one of the constant mass flow installations of FIGS. 3*a* and 3*b*;

FIG. 5 is a view in longitudinal section schematically illustrating constant mass flow apparatus installed in a tubing string disposed concentrically in a multiple zone well bore;

FIGS. 6*a*, 6*b* and 6*c* are longitudinal section views illustrating a specific constant mass flow apparatus, as generally taken on the plane of the line 6—6 of FIG. 5, and as representative of such apparatus, FIG 6*b* being a downward continuation of FIG. 6*a*, and FIG. 6*c* being a downward continuation of FIB. 6*b*;

FIG. 7 is a transverse sectional view as taken on the line 7—7 of FIG. 6*a*; and FIG. 8 is a transverse sectional view as taken on the line 8—8 of FIG. 6*a*.

Figure 1:
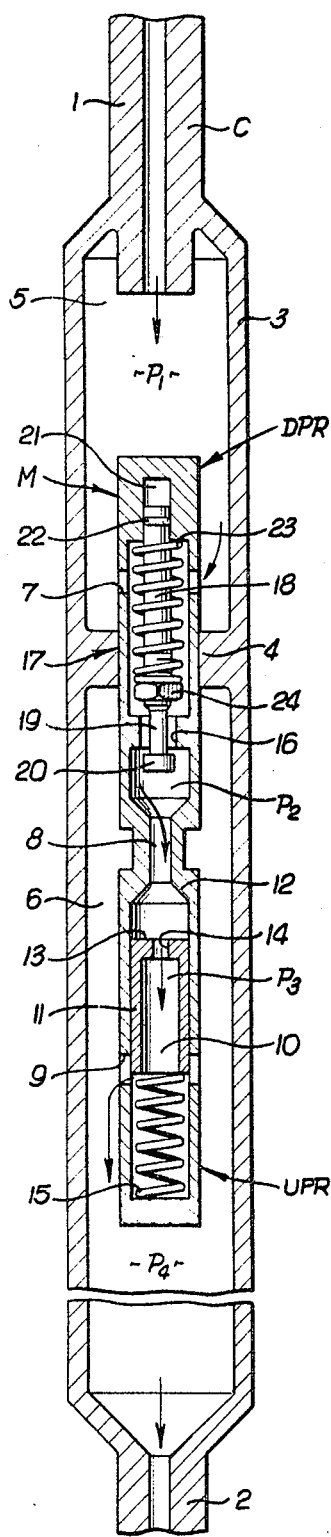
FIGURE 1 is a view in longitudinal section showing constant mass flow apparatus in accordance with the invention installed in a pipeline.
Figure 2:
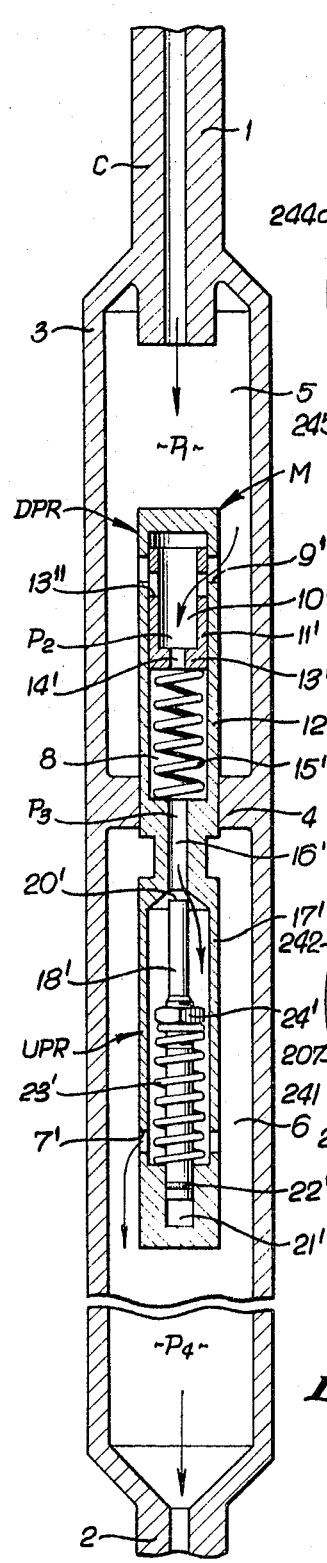
FIG. 2 is a view generally corresponding to FIG. 1, but illustrating another embodiment of flow regulating devices.

Referring first to FIGS. 1 and 2, there is shown an application of the mass flow rate control devices of the present invention to pipe or conduit such as might be located, for example, on the surface of the earth for conducting compressible fluids, and including a pipe or conduit generally denoted at C, the upstream or input section of which is designated 1 and the downstream or output section of which is designated 2, as indicated by the arrows illustrative of the direction of flow of the fluids through the conduit C. Interposed between the upstream section 1 of the conduit and the downstream section 2 thereof is an enlarged housing section 3, which may be installed in the conduit C in any suitable fashion and which provides a center support and a seal 4 separating the housing 3 into an upstream chamber 5 and a downstream chamber 6. Mounted in the support 4 is an illustrative embodiment of mass flow control apparatus made in accordance with the invention and generally denoted at M.

This mass flow control appartus M includes in FIG. 1 a downstream pressure regulator designated DPR adapted, in a manner which hereinafter will be described, to maintain a constant downstream pressure and which, effectively, is disposed in the upstream chamber 5 in the sense that fluid will pass from the chamber 5 into the downstream pressure regulator beneath the downstream pressure regulator. Effectively in the downstream chamber is an upstream flow regulator designated UFR, which, in a manner hereinafter to be more particularly described, holds upstream pressure at a contsant value and which discharges into the downstream chamber 6. Flow of fluid through the assembly, as seen in FIG. 1, is into the upstream chamber 5, through ports 7 in the downstream pressure regulator DPR into an intermediate chamber 8 between the downstream pressure regulator and the upstream flow regulator UFR, and from the latter through ports 9 into the downstream chamber 6.

Included in the upstream flow regulator between the ports 9 and the intermediate chamber 8 is a chamber 10 formed in an elongate sleeve 11 which is reciprocably disposed within the body 12 of the upstream flow regulator UFR. This sleeve 11 has at its upper end an end wall 13 having an orifice 14 leading from the intermediate chamber 8 into the chamber 10. The lower extremity of the sleeve 11 cooperates with the port 9 to provide throttle valve means, and sleeve 11 is normally biased upwardly by a coil spring 15 disposed in the lower end of the body 12 of the upstream flow regulator UFR. In this connection, it will be appreciated that a downward force on the sleeve 11 opposed by the spring 15 will be a function of the pressure differential across the oriffice 14.

The downstream pressure regulator DPR includes a passage 16 leading into the intermediate chamber 8 from the hollow body 17 of the downstream pressure regulator, in which is disposed an elongated stem 18 having, at its lower end, a reduced section 19 which extends through the passageway 16. At its lower end, the reduced stem section 19 has a head 20 thereon which is of the same diameter as the passage 16, so as to effectively constitute a throttling valve. At its upper end, the stem 18 is disposed in a blind chamber 21 which is at atmospheric pressure, the stem 18 having seal means 22 thereon slidable in the chamber 21 to maintain a leakproof relationship therebetween. Within the body 17 of the downstream pressure regulator DPR is a spring designated 23, which normally acts downwardly on the stem 18, being engaged at its upper end with an abutment within the housing 17 and engaged at its lower end with an abutment 24 on the stem 18. This latter abutment may comprise an adjustable nut threadedly disposed on the stem 18 so as to vary the effective force of the spring 23.

The pressure acting against or opposing the spring 23, and therefore tending to cause throttle valve head 20 to close the passageway 16, is the effective pressure in the intermediate chamber 8 which will act upon the lower end area of the throttle valve head 20, the remainder of the stem 18, with the exception of the upper extremity thereof, in the atmospheric chamber 21 being pressure balanced, the stem end in chamber 21 being of the same cross-sectional area as the body of the stem and the end face of valve head 20.

It will now be noted that in all essential respects, the structure of apparatus M described is very simple in its concept and organization, but it is capable of performing a function which has heretofore required the use of rather complex apparatus, namely, the maintenance of the flow rate from inlet end 1 to the outlet end 2 of the conduit C at a constant mass rate. In this connection, it may be assumed that the inlet or upstream pressure chamber 5 is $P_1$, and the outlet or downstream pressure in the chamber 6 is $P_4$; the pressure in the intermediate chamber 8 at one side of oriffice 14 may be designated $P_2$, while pressure at the other side of the oriffice 14 in the chamber 10 of the upstream flow regulator in $P_3$. The pressure $P_1$ and $P_4$ may be variable in the case of the present structure, with the result that fluid at pressure $P_1$ flowing into the downstream pressure regulator through ports 7 will pass through the passageway 16 into the intermediate chamber 8, where it will act upwardly on the lower end of the throttle valve 20 against the counterforce of spring 23. Since the downstream pressure regulator has the upper end of the stem 18 disposed in the atmospheric chamber 21 and is otherwise pressure balanced, the only forces involved which act upon the stem to position the throttle valve head 20 are the downward force of the spring 23 and the upward force of pressure $P_2$ in the chamber 8. Therefore, the device will automatically maintain the throttle valve head 20 at a position at which the pressure $P_2$ remains constant. This is to say that if the upstream pressure $P_1$ should increase, the increased pressure passing through the passageway 16 and into the intermediate chamber 8 will produce a greater upward force by its action upon the end area of the throttle valve head 20, tending to move the stem, upwardly, whereby to partially close off the passageway 16 and reduce the permitted flow through the passageway 16; whereas, in the event that the pressure $P_1$ in the inlet or upstream chamber 5 should be reduced, then the pressure passing through the ports 7 and the passageway 16 into the intermediate chamber 8 and acting upwardly on the lower end of throttle valve 20 will offer less resistance to downward movement of stem 18 under the influence of spring 23, so that the passageway 16 may be opened to a greater extent to allow greater fluid flow through the latter. Thus, the downstream pressure regulator has an automatic tendency to endeavor at all times to maintain constant the pressure acting on the lower end face to the throttle valve head 20 in the intermediate chamber 8.

The pressure $P_2$ in the intermediate chamber 8 is imposed upon upper end 13 of the sleeve 13 within the body of the upstream flow regulator UFR. Flid flow from the intermediate chamber 8 will be through the orifice 14 into the chamber 10 within the sleeve 11, in which the pressure will be reduced as compared with the pressure in the intermediate chamber 8. Spring 15 acting upwardly on the sleeve 11, of course, will effect positioning of the sleeve 11 as a function of the pressure drop across the orifice 14, so that the ports 9 will be more or less opened to allow more or less flow through the ports 9, whereby to automatically maintain pressure $P_3$ at a constant value, notwithstanding variation in the pressure $P_4$ in the downstream or outlet chamber 6 of the conduit C.

It will now be apparent that the present invention, as disclosed in the environment of FIG. 1 employs a combination of a downstream pressure regulator at the upstream or inlet end of the assembly to maintain a constant pressure $P_2$ on one side of the oriffice 14, while the upstream flow regulator at the downstream side of the chamber 8 is effective to maintain a constant pressure $P_3$ at the other side of the orifice 14. The pressure drop across the oriffice therefore remains constant, as well as the density of the fluid flowing through the oriffice, and there is a consequential constant mass rate of flow through the oriffice 14. This result is accomplished with devices which are comparatively simple in their construction and mode of operation.

Referring now to FIG. 2, it will be observed that the same result is accomplished by a substantial inversion of the functional relationship of the regulator devices shown in FIG. 1, inasmuch as within the housing section 3 and operable in the inlet chamber is a downstream flow regulator DFR cooperating with an upstream pressure regulator UPR in the outlet or the downstream chamber 6.

The downstream flow regulator in FIG. 2 has inlet ports 9′ through which fluid will pass into a chamber 10' formed in an elongate sleeve 11' reciprocably disposed within the body 12' of the downstream flow regulator DFR. The end wall 13' of the sleeve 11' is provided with an orifice 14', and within the body 12' is a spring 15' acting upwardly against the sleeve 11' so as to control the position of the sleeve, and more particularly the position of throttle valve ports 13" in the latter which more or less register with the inlet ports 9' to control the rate of flow into the chamber 10' and, therefore, to control the pressure acting on the upstream side of the end wall 13' through which extends the orifice 14'. Thus, in the downstream flow regulator DFR, it will be noted that the pressure in the sleeve chamber 10' will be maintained substantially constant as a function of adjustment of the position of the sleeve by the spring 15' in response to a tendency of the pressure in the chamber 10' to vary. Downstream of the orifice 14' is the intermediate chamber 8 corresponding to the intermediate chamber described in respect of the structure shown in FIG. 1, and in which it is desired that the pressure be maintained constant so that the mass rate of flow through the orifice 14' will be maintained constant.

The upstream pressure regulator UPR in FIG. 2 performs the function of maintaining the intermediate chamber pressure constant, as did the upstream flow regulator UFR in the embodiment of FIG. 1. The upstream pressure regulator UPR has an inlet passage 16' leading into the body 17', in which is reciprocably disposed a valve stem 18', the upper end 20' of which is movable toward and away from the discharge end of the passage 16' so as to control the rate of flow through the latter. Stem 18' is at its lower end disposed in an atmospheric chamber 21', and is provided with sealing means 22' cooperative with the chamber wall to form a seal therewith. Acting upwardly on the stem 18' is a coil or helical spring 23' engaging a stem abutment 24' in the form of an adjustable nut. Thus, the pressure acting on the end face 20' of the stem 18' is productive of a force tending to move the stem 18' downwardly so as to increase flow through passageway 16', while the spring 23' is productive of a force acting upwardly and tending to close off the flow through the passage 16' into the body 17', and therefrom through outlet ports 7' into the downstream chamber 6. Here again, as a function of the force supplied by spring 23' in relation to the pressure acting on the end face 20', the pressure within the intermediate chamber 8 downstream of the orifice 14' will be maintained constant. Therefore, there is a constant pressure drop across the orifice 14' due to the fact that the pressures at both sides of the orifice are maintained substantially constant.

Referring now to FIGS. 3a to 4, mass flow apparatus, such as that just described above, is illustrated as installed in a well production tubing or conduit C leading from a plurality of productive well zones $Z_1$, $Z_2$ to the top of the well bore, which well bore has had well casing W set therein, the casing having been provided with perforations 30 in the region of an upper productive well zone $Z_1$, and with perforations 31 in the region of a lower productive well zone $Z_2$. In this illustrative embodiment, the usual well bore packing means 33 has been set in the well bore or casing W and forms a seal with the production tubing C above the upper productive zone $Z_1$, and another similar packing means 34 has the tubing C between the upper zone $Z_1$ and the lower zone $Z_2$ so as to isolate the zones from one another.

In the production of fluids from multiple well zones, it is often desirable to conduct the production fluids from both zones to the surface of the earth through a single production pipe or tubing, such as that designated C, with the fluids from both zones commingled, but it is nevertheless desirable and sometimes necessary to produce each of the zones at a known mass rate of flow. Therefore, the present invention provides simple means for maintaining a constant mass rate of flow from each of the zones.

In the production tubing C, as seen in FIG. 3a, there is provided a side pocket 103 corresponding to the conduit housing 3 referred to above in respect of FIGS. 1 and 2. Installed in the side pocket 103 is the mass flow regulating apparatus M combined with means generally designated 103a by which the apparatus M may be run into the well through the production tubing on a wire line (not shown), as is well known. This apparatus M is shifted into the side pocket and retrievably latched therein so as to be retrievable therefrom by wireline recovery equipment, in a known manner. The side pocket or housing 103 includes an inlet 101 into a chamber 105 and an outlet chamber 106, separated by a packing or seal 104 carried by the flow control apparatus M and sealingly engaged with the inside wall of the side pocket 103. Included in the apparatus W of FIG. 3a may be a downstream pressure regulator DPR and an upstream flow regulator UFR.

The downstream pressure regulator DPR of FIG. 3a includes an inlet port 107 into which fluid will pass from the productive zone $Z_1$, after passing through the inlet port 101 of the side pocket 103 from the isolated space between the packers 33 and 34, into which space the fluid flows from the zone $Z_1$ through the perforations 30. Fluid from zone $Z_1$ will then pass through the mass flow control apparatus M and into the production tubing C, as shown by the arrows, discharging from the upstream flow regulator through ports 109 into the upstream chamber 106, and thence through the running and recovery means 103a, as will hereinafter be more fully described.

It will now be apparent that a similar result can be accomplished in the control of the mass rate of flow of the production fluid emanating from zone $Z_2$ through casing perforations 31 by the mass flow apparatus M shown in the first described structure of FIG. 1, or which may correspond to the structure shown in FIG. 2. In the latter event, in the side pocket 103' of FIG. 3b would be a upstream pressure regulator UPR connected beneath the running and recovery head 103a and combined with an downstream flow regulator DFR, separated from one another by packing 104'. Thus, production from the zone $Z_2$ may pass through the perforations 31 into the casing W and into the upstream chamber 105 through side pocket openings 101. Such fluid would flow into the downstream flow regulator DFR through ports 109' and through the upstream pressure regulator UPR, discharging from its ports 107' into the upstream chamber 106. In either event, it will be appreciated that the mass flow mechanism M will maintain a constant mass flow rate therethrough from the respective well zones.

Referring now to FIG. 4, a typical installation of the mass flow control apparatus M is shown corresponding to the arrangement of FIGS. 1 and 3a, and in which the recovery head 103a will be seen to include latch elements 103b adapted to engage beneath a side pocket shoulder 103c to releasably retain the apparatus M in the side pocket 103. The running and recovery head also includes a neck 103d having an upper end flange 103e engageable by the above-mentioned running and recovery wireline equipment. Running and recovery heads of the type generally indicated at 103a are well known and need not be shown in detail for purpose of the illustration of FIG. 4. However, it will be noted that fluid passing into the downstream chamber 106 from the upstream pressure regulator UPR may pass through lateral ports 103f leading to a longitudinally extended port 103g, from whence the production fluid will bass into the production tubing or conduit C.

If desired, in the case of the utilization of mass flow production apparatus M for controlling the production of well fluids, as shown in FIG. 4, a check valve 108' may be employed between the downstream flow regulator DFR and the upstream pressure regulator UPR to prevent back flow of fluid from the tubing into the casing in the event that such back flow should tend to occur.

Otherwise, the apparatus of FIG. 4 is identical to that shown in FIG. 1 and corresponding reference characters are therefore applied.

Referring to FIG. 5, apparatus embodying the present invention is illustrated as being disposed in a well bore wherein the production conduit or tubing designated C is concentrically disposed within the well casing W, and extends through a plurality of productive zones including the upper zone $Z_1$ and the lower zone $Z_2$. The production conduit C, as in the case of FIGS. 3a and 3b, is sealingly engaged by an upper packer 33 above the zone $Z_1$ and a packer 34 below the zone $Z_1$ and above the zone $Z_2$, so as to isolate the production through perforations 30 and 31 from the respective zones, such production finding access to individual mass flow apparatus M adapted to control the flow from the respective zones at a constant mass flow rate from each zone.

FIGS. 6a to 6c show in detail a representative mass flow apparatus in a concentric production tubing organization, such as that generally shown in FIG. 5. As seen in FIGS. 6a to 6c, each apparatus M comprises an elongate tubular body or housing 203 including an upper sub 203′ threadedly connected to the production conduit or tubing C at its upper end. At the lower end of the housing 203 is a bottom sub 203″ connected to a downward extension of the production tubing or conduit C. Such tubing connected to an upper apparatus M will be understood to extend downwardly therefrom through the packer 34, shown in FIG. 5, for connection to a similar assembly M for controlling production from the lower zone $Z_2$.

Interiorly of the housing 203 is a fixed sleeve 240 secured in spaced relation to the housing by a plurality of nipples 241 providing fluid inlets 242 from the interior of the well casing, these nipples being welded or otherwise secured to the housing and to the sleeve 240. If desired, a sleeve valve 243 may be provided for selectively opening and closing the ports 242, this sleeve valve being reciprocably disposed within the fixed sleeve 240 and having valve ports 244 adapted, when the sleeve 243 is in a lower position, to register with the ports 242 in nipples 241. Sleeve 243 has an upper set of ports 244a adapted to be disposed above the upper end of fixed sleeve 240 when the sleeve 243 is in its upper position. This sleeve valve structure is optional, forms no part of the present invention, and is more particularly shown and described in application Ser. No. 488,943, filed Sept. 21, 1965. In the illustrative embodiment, however, the sleeve valve is operated by a running and recovery assembly including a recovery head 245 having a body adapted to be engaged by suitable wireline running and recovery equipment (not shown), as more particularly disclosed in the aforementioned application. The body of head 245 has lateral ports 245a communicating with ports 244a in the valve sleeve 243 when the latter is in the lower position, as shown in FIG. 6a. These ports 245a lead into an axially extended passage 245b in the head which opens into the production tubing or conduit C thereabove. The running and recovery head 245 also includes suitable latch mechanism 245c for holding the assembly, including the mass flow apparatus hereinafter to be described, within the housing 203.

Valve sleeve 243 is adapted to be latched by latch elements 245c, 246 in the lower position with the ports 244 communicating with the inlets 242, and when the valve is moved to an upper position, spring-like latch elements 247 are adapted to engage in an enlarged bore or groove 247a in the sub 203′ to hold the valve sleeve in an upper position (not shown) at which the inlets 242 will be closed.

Also included in the recovery head is a lower body section 248 which supports, by a threaded connection 249, the body 217 of the downstream pressure regulator DPR. This body includes an upper section threadedly connected to the body 248 of the running and recovery head and extended downwardly in sealed relation to the valve sleeve 243, there being sealing means or packings 250, 251 disposed about the body 217 and in sealing engagement with the inner wall of the valve sleeve 243. Between these packings 250 and 251, the body 217 of the downstream pressure regulator is provided with the inlet ports 207, the body section 217 being threadedly connected, as at 217a, to a downwardly extended section 217b threaded to a coupling 217c to which the body 212 of the upstream flow regulator UFR is threadedly secured. An outlet fitting 212a is attached to the body 212, having an outlet passage 212b leading into the upstream chamber 205 of the housing 203.

Referring again to FIG. 6a, it will be noted that the downstream pressure regulator DPR includes the atmospheric chamber 221 defined by a tubular insert 221a sealingly disposed in the upper end of the body section 217 and having a bore therethrough closed at its upper end by a plug 221b. Slidably and sealingly disposed in the bore of the member 221a is a longitudinally ported member 218a constituting the upper end of the stem 218, which, in the embodiment being described, is a tubular member connected to the lower extremity of the member 218a. As seen in FIG. 6b, the tubular stem 218 extends downwardly into the body section 217b and is provided at its lower end with a screw threaded stem section 218b on which are threadedly disposed adjuster and jam nut means 218c, whereby to adjust the effective force of the control spring 223. The threaded stem section 218b is threadedly connected to, or otherwise provided with, a throttle valve member 220 which is reciprocably disposed in a bore within a valve housing 216a having the flow passage 216 therein. The throttle valve 220 has a reduced stem section 220a and an enlarged head 220b adapted, upon axial movement of the stem 218, to move towards and away from the lower end of the passageway 216 so as to effectively throttle flow therethrough into the coupling 217c. A passage 208 is formed in the coupling 217c, this passage effectively constituting the intermediate chamber between the downstream pressure regulator DPR and the upstream flow regulator UFR.

In the embodiment now being described, the upstream flow regulator (FIG. 6c) includes the sleeve 211 reciprocably disposed in the body 212 and having a shoulder 211a against which one end of the coil spring 215 abuts, the other end of the coil or helical spring abutting against an insert 212c disposed within the body 212 and extended downwardly to provide a skirt 212d having the discharge ports 209 communicating with the downstream chamber 206. A plug 212f closes the insert 212c below the ports. The sleeve 211 is slidable in the insert 212c so that its lower end effectively constitutes a valve for throttling the opening through the ports 209. Internally of the sleeve 211a and retained by means of a snap ring 214a is an orifice member having the orifice 214 therethrough. At the upper end of the sleeve 211 is a check valve 208′ which will serve the function to prevent backflow through the mass flow control apparatus in the event reverse flow should tend to occur.

From the foregoing, it will now be apparent that the structure disclosed in FIGS. 6a to 6c is representative of one of the multiple zone installations M of FIG. 5, and the mass flow control apparatus for controlling production from zone $Z_1$ and the apparatus for controlling production from zone $Z_2$ may either both correspond to that shown in FIGS. 6a to 6c; that is, the apparatus M may comprise upstream regulator means in the form of a downstream pressure regulator DPR and downstream regulator means in the form of an upstream flow regulator UFR, respectively, located upstream and downstream of an orifice, or alternatively, it will now be understood the mass flow rate control apparatus M at either of the zone $Z_1$ or $Z_2$ may comprise a downstream flow regulator DFR upstream of the orifice and an upstream pressure regulator UPR downstream of the orifice, so that in either event there will be maintained a constant pressure on each side of the orifice and a constant pressure drop across the orifice.

In the illustrative embodiment of FIGS. 6a to 6c, assuming the ports 242 and 244 through the housing 203 and the valve sleeve 243, respectively, to be open, as shown in FIG. 6a, production fluid may pass through the ports 242 and 244 and flow downwardly into ports 207 leading into the downstream pressure regulator housing 217. Fluid will then proceed downwardly through the annular space between the stem 218 and the downwardly extended housing section 217b, and through the passage 216 in the throttle valve body 216a, at a rate determined by the pressure acting on the throttle valve head 220b, tending to close the throttle valve and the opposing force of spring 223 tending to open the valve. From the intermediate chamber 208 below the throttle valve means, forming a part of the downstream pressure regulator DPR, the fluid will pass around the ball check valve 208' into the upstream flow regulator housing 212 and downwardly through the hollow stem 211 therein through orifice 214, thence outwardly through ports 209 into the downstream chamber 206.

In the downstream chamber 206, the production fluid from the zone $Z_1$ will commingle with the production fluid produced from zone $Z_2$ and flow upwardly in the annular space between the flow control apparatus M and the housing 203, and through the ports 244a and 245a in the valve sleeve 243 and the recovery head body 245, respectively, into the upwardly extended passageway 245b therethrough and on into the production conduit or tubing C thereabove.

Inasmuch as the permitted flow of fluid from the upstream flow regulator through the throttle valve ports 209 will be a function of the effective downward force provided by production fluid pressure acting on the cross-sectional end area of the sleeve 211, namely, the effective annular area of the orifice member, acting downwardly against the force of the spring 215, which acts upwardly, the actual pressure downstream of the orifice 214 will be maintained substantially constant. Therefore, the constant upstream pressure and constant downstream pressure at the respective sides of the orifice 214 will be productive of a constant pressure drop therethrough and a constant mass rate of flow of production fluid from zone $Z_1$ through the production tubing C to the earth's surface, notwithstanding variations in the pressure in the production tubing above the mass flow control apparatus or in the formation pressure of the zone $Z_1$, so long as the latter exceeds the former. However, in the event that pressure in the tubing string should exceed the formation pressure tending to cause backflow through the mass flow rate control apparatus, the backflow valve 208' will be automatically closed to prevent such backflow.

I claim:

1. In apparatus for maintaining the flow of a compressible fluid through a conduit at a constant mass rate: upstream regulator means and downstream regulator means adapted to be installed in the conduit and having an orifice interposed in the path of fluid flow, said upstream regulator means having throttle valve means responsive to fluid pressure for maintaining a constant pressure at one side of said orifice, and said downstream regualtor means having throttle valve means responsive to fluid pressure for maintaining a constant pressure at the other side of said orifice.

2. Apparatus as defined in claim 1, wherein said regulator means includes means defining a chamber at one side of said orifice, and one of said regulator means comprises a pressure regulator having its throttle valve means exposed to the pressure of fluid in said intermediate chamber to control pressure in said chamber.

3. Apparatus as defined in claim 1, wherein said regulator means includes means defining a chamber at one side of said orifice, one of said regulator means comprising a pressure regulator having its throttle valve means exposed to the pressure of fluid in said intermediate chamber to control pressure in said chamber, and the other of said regulator means comprising a flow regulator having its throttle valve means disposed to control flow therethrough at the other side of said orifice.

4. Apparatus as defined in claim 1, wherein one of said regulator means comprises a hollow body having a stem reciprocably disposed therein, said body having a sealed chamber in which one end of said stem is disposed, said throttle valve means being at the other end of said stem and including a passage in said body communicating with the interior of said body and throttled by said other end of said stem, said body having a port for establishing communication between the interior of said body and said conduit, said other end of said stem having an end area exposed to the pressure of fluid at the adjacent side of said orifice, the rest of said stem being pressure balanced, and spring means acting on said stem to bias the same to a throttling position dependent upon the pressure acting on said end area of said stem.

5. Apparatus as defined in claim 4, wherein said stem extends through said passage and has a reduced section providing a flow path through said passage downstream from said port, and said other end of said stem has a head downstream of said passage movable toward and away from said passage to throttle flow therethrough, said spring acting to move said head away from said passage.

6. Apparatus as defined in claim 4, wherein said other end of said stem is movable toward said passage by said spring means, and said port is downstream from said passage.

7. Apparatus as defined in claim 1, wherein said upstream regulator means comprising downstream pressure regulator means having a throttle valve for maintaining a constant pressure at the upstream side of said orifice, and said downstream regulator means comprising an upstream flow regulator having throttle valve means for maintaining a constant pressure at the downstream side of said orifice.

8. Apparatus as defined in claim 1, wherein said upstream regulator means comprising a downstream flow regulator having throttle valve means for maintaining a constant pressure at the upstream side of said orifice, and said downstream regulator means comprising an upstream pressure regulator having throttle valve means for maintaining a constant pressure at the other side of said orifice.

9. In apparatus for controlling the flow of a compressible fluid through a conduit: a housing disposable in the conduit and having an upstream chamber and a downstream chamber, means for maintaining a constant mass rate flow of fluid through the housing, said means forming an intermediate chamber and including an orifice between said intermediate chamber and one of said upstream and downstream chambers, regulator means including a passage leading from said intermediate chamber to the other of said upstream and downstream chambers, said regulator means also including a valve for throttling said passage, biasing means acting on said valve for moving the same in a direction to throttle said passage, said valve having a surface responsive to pressure in said intermediate chamber for opposing said biasing means to maintain a constant pressure in said intermediate chamber regardless of variations in pressure in the other of said upstream and downstream chambers, and said regulator means further including means for maintaining a constant pressure at the other side of said orifice from said intermediate chamber.

10. Apparatus as defined in claim 9, wherein said orifice leads between said intermediate chamber and said downstream chamber, and said passage leads to said upstream chamber.

11. Apparatus as defined in claim 9, wherein said orifice leads between said intermediate chamber and said upstream chamber, and said passage leads from said intermediate chamber to said downstream chamber.

12. Apparatus as defined in claim 9, wherein said housing comprises a section adapted to be disposed in a well production tubing string in a well bore leading to the earth's surface, and including means releasably retaining said regulator means in said housing in sealed relation therewith to define said upstream and downstream chambers.

13. In apparatus for conducting compressible well production fluid from a producing zone through a tubing string to the top of a well bore at a constant mass rate of flow regardless of variations in production pressure at the zone or in the tubing strong: a tubing string in the well bore, packing means set in the well bore in sealed relation to said tubing string to confine the production fluid to a flow path through said tubing string, upstream regulator means and downstream regulator means in said tubing string including an orifice interposed in the path of fluid flow between said regulator means, said upstream regulator means having throttle valve means responsive to the well production fluid pressure from said zone for maintaining a constant pressure at one side of said orifice, and said downstream regulator means having throttle valve means responsive to the pressure of fluid in the tubing string for maintaining a constant pressure at the other side of said orifice.

14. Apparatus as defined in claim 13, wherein said upstream regulator means comprises a downstream pressure regulator, the throttle valve means of said downstream pressure regulator including a valve member having a surface exposed to the pressure of fluid upstream of said orifice providing a force tending to close said throttle valve means, and a spring acting on said valve member to move said valve member in a direction to open said throttle valve means of said downstream pressure regulator.

15. Apparatus as defined in claim 13, wherein said downstream regulator means comprises an upstream flow regulator, the throttle valve means of said upstream flow regulator including a valve member downstream of said orifice, a part providing a fluid pressure responsive area responsive to the pressure of fluid upstream of said orifice for moving said throttle valve member in a direction to close said throttle valve means of said upstream flow regulator, and a spring acting on said throttle valve member to move said throttle valve member in a direction to open said throttle valve means of said upstream flow regulator.

16. Apparatus as defined in claim 13, wherein one of said regulator means comprises a body having an inlet passage and an outlet passage, said throttle valve means of said one of said regulator means comprising a stem disposed in said body, one end of said stem having a surface adjacent one of said passages and responsive to fluid pressure for urging said stem in one direction, said body having a chamber at atmospheric pressure in which the other end of said stem is sealingly and reciprocably disposed, and a spring in said body acting on said stem for urging said stem in the opposite direction.

17. In apparatus for conducting compressible well production fluid from a plurality of producing zones to the top of a well bore: a tubing string in the well bore, packing means set in the well bore in sealing relation to said tubing string to isolate the production fluid from the respective zones, flow control means in the tubing string for the respective zones, each of said flow control means including means for maintaining the flow into the tubing string from the respective zones at a constant mass rate regardless of variations in the production pressure at the respective zones or in the tubing string thereabove, each of said flow maintaining means comprising an orifice, means for maintaining the pressure on the upstream side of said orifice at a substantially constant value, and means for maintaining the pressure on the downstream side of said orifice at a substantially constant value.

18. In apparatus for conducting compressible well production fluid from a plurality of producing zones to the top of a well bore: a tubing string in the well bore, packing means set in the well bore in sealing relation to said tubing string to isolate the production fluid from the respective zones, flow control means in the tubing string for the respective zones, each of said flow control means including means for maintaining the flow into the tubing string from the respective zones at a constant mass rate regardless of variations in the production pressure at the respective zones or in the tubing string thereabove, wherein each of said mass flow control means comprises upstream regulator means and downstream regulator means in said tubing string and an orifice interposed in the path of fluid flow between said upstream regulator means and said downstream regulator means, said upstream regulator means having throttle valve means responsive to the well production fluid pressure from the zone for maintaining a constant pressure at one side of said orifice, and said downstream regulator means having throttle valve means responsive to the pressure of fluid in the tubing string for maintaining a constant pressure at the other side of said orifice.

19. Apparatus as defined in claim 17, wherein said mass flow control means and said tubing string include means for releasably supporting said flow control means in said tubing string.

20. Apparatus as defined in claim 17, wherein said tubing string is provided with a side pocket at each of said zones, and said flow control means includes mass flow control apparatus in the respective side pocket of each zone.

21. Apparatus as defined in claim 17, wherein said flow control means at each zone includes an elongate housing interconnected at its ends in said tubing string, means in said housing at each zone for providing a production fluid inlet into said housing and an outlet leading from said housing into the tubing string, and said flow control means is interposed in said housing between said inlet and said outlet.

22. A regulator adapted to be installed in the path of fluid flow to maintain a constant pressure condition comprising: a body having an inlet passage and an outlet passage, a stem reciprocably carried by said body, said body having an atmospheric chamber in which one end of said stem is sealingly disposed, the other end of said stem being disposed adjacent one of said passages and having an end area subjected to fluid pressure for biasing said stem in one direction, and spring means acting on said stem for biasing the stem in the other direction, the remainder of said stem being pressure balanced, whereby said stem will move relative to said one of said passages to regulate the flow of fluid therethrough at a rate determined by the force of said spring resisting movement of said stem in response to the pressure acting on said end area of said stem.

23. A regulator as defined in claim 22, wherein said stem extends through said outlet passage and said end area of said stem responds to the pressure downstream of said outlet passage whereby to maintain a constant downstream pressure.

24. Apparatus as defined in claim 23, wherein said end area of said stem is disposed downstream of said inlet passage and said end area of said stem is responsive to pressure in said inlet passage so as to maintain a constant upstream pressure.

25. In apparatus for conducting compressible fluid between a plurality of producing zones and the top of a well bore: a tubing string in the well bore, packing means set in the well bore in sealing relation to said tubing string to isolate the respective zones from each other, flow control means in the tubing string for the respective zones, each of said flow control means including means for maintaining the flow between the tubing string and the respective zones at a constant mass rate regardless of variations in the pressure at the respective zones or in the tubing string, each of said flow maintaining means comprising an orifice, means for maintaining the pressure on the upstream side of said orifice at a substantially constant value, and means for maintaining the pressure on the downstream side of said orifice at a substantially constant value.

26. In apparatus for conducting compressible fluid between a plurality of producing zones and the top of a well bore: a tubing string in the well bore, packing means set in the well bore in sealing relation to said tubing string to isolate the respective zones from each other, flow control means in the tubing string for the respective zones, each of said flow control means including means for maintaining the flow between the tubing string and the respective zones at a constant mass rate regardless of variations in the pressure at the respective zones or in the tubing string, wherein each of said mass flow control means comprises upstream regulator means and downstream regulator means in said tubing string and an orifice interposed in the path of fluid flow between said upstream regulator means and said downstream regulator means, said upstream regulator means having throttle valve means responsive to the fluid pressure from the zone for maintaining a constant pressure at one side of said orifice, and said downstream regulator means having throttle valve means responsive to the pressure of fluid in the tubing string for maintaining a constant pressure at the other side of said orifice.

27. In apparatus for conducting compressible fluid between the earth surface and a subsurface well zone at a constant mass rate of flow: a tubing string in the well bore, packing means set in the well bore in sealing relation to said tubing string to confine the fluid flow to a path through said tubing string, and pressure regulator means interposed in said path of fluid flow for automatically maintaining said flow at a constant mass rate regardless of variations in the pressure of fluid in the tubing string or in the zone, said pressure regulator means comprising an orifice, means for maintaining the pressure on the upstream side of said orifice at a substantially constant value, and means for maintaining the pressure on the downstream side of said orifice at a substantially constant value.

28. Apparatus as defined in claim 27, wherein said pressure regulator means includes throttle valve means responsive to the pressure of fluid in said zone.

29. Apparatus as defined in claim 27, wherein said pressure regulator means includes throttle valve means responsive to the pressure of fluid in said tubing string.

30. In apparatus for conducting compressible fluid between the earth surface and a subsurface well zone at a constant mass rate of flow: a tubing string in the well bore, packing means set in the well bore in sealing relation to said tubing string to confine the fluid flow to a path through said tubing string, and regulator means interposed in said path of fluid flow for automatically maintaining said flow at a constant mass rate regardless of variations in the pressure of fluid in the tubing string or in the zone, wherein said regulator means includes downstream regulator means and upstream regulator means and an orifice between said downstream regulator means and upstream regulator means, each of said downstream and upstream regulator means including a throttle valve responsive to pressure at the respective side of said orifice and means for adjusting said throttle valve for maintaining the pressure at opposite sides of said orifice at a substantially constant value.

References Cited
UNITED STATES PATENTS

| | | | |
|---|---|---|---|
| 3,045,759 | 7/1962 | Garrett et al. | 166—224 |
| 3,282,341 | 11/1966 | Hodges | 166—115 |
| 3,283,570 | 11/1966 | Hodges | 166—115 |
| 3,319,717 | 5/1967 | Chenoweth | 166—115 |

JAMES A. LEPPINK, Primary Examiner

U.S. Cl. X.R.

137—501; 166—115